(12) United States Patent
Holub et al.

(10) Patent No.: US 12,124,919 B2
(45) Date of Patent: *Oct. 22, 2024

(54) COLOR DRIVEN LOCALIZATION OF 1D AND 2D BARCODES IN DIGITAL CAPTURE SYSTEMS

(71) Applicant: Digimarc Corporation, Beaverton, OR (US)

(72) Inventors: Vojtech Holub, Lafayette, CO (US); Vahid Sedighianaraki, Portland, OR (US); Adnan M. Alattar, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,946

(22) Filed: Apr. 25, 2023

(65) Prior Publication Data

US 2023/0376712 A1    Nov. 23, 2023

Related U.S. Application Data

(63) Continuation of application No. 17/339,582, filed on Jun. 4, 2021, now Pat. No. 11,636,279.

(60) Provisional application No. 63/092,993, filed on Oct. 16, 2020, provisional application No. 63/037,569, filed on Jun. 10, 2020.

(51) Int. Cl.
 *G06K 7/14* (2006.01)
(52) U.S. Cl.
 CPC ......... *G06K 7/1417* (2013.01); *G06K 7/1413* (2013.01)

(58) Field of Classification Search
 CPC .......................... G06K 7/1417; G06K 7/1413
 See application file for complete search history.

(56) References Cited

U.S. PATENT DOCUMENTS

| | | |
|---|---|---|
| 9,380,186 B2 | 6/2016 | Reed |
| 10,198,648 B1 | 2/2019 | Bradley |
| 10,650,209 B2 | 5/2020 | Holub |
| 10,664,722 B1 | 5/2020 | Sharma |
| 10,805,587 B1 | 10/2020 | Wilfred |
| 11,257,198 B1 | 2/2022 | Holub |
| 11,636,279 B1 * | 4/2023 | Holub ................. G06K 7/1417 235/462.1 |
| 2006/0027662 A1 | 2/2006 | Baradi |

(Continued)

*Primary Examiner* — Matthew Mikels
(74) *Attorney, Agent, or Firm* — Digimarc Corporation

(57) ABSTRACT

The present disclosures relates to decoding machine readable indicia (e.g., a 1D or 2D barcode) in imagery, and related image processing technology. One claim recites a method of locating a barcode within imagery, comprising: converting the imagery to greyscale imagery; evaluating a plurality of blocks within the greyscale imagery, each of the plurality of blocks comprising n×m pixels, where both n and m are positive integers; for each block of the plurality of blocks, determining a value representing pixel diversity within the block; masking the greyscale imagery based on values of the plurality of blocks, in which blocks with a value below a predetermined value of pixel diversity are masked out or excluded; searching the masked, greyscale imagery to determine whether is includes a barcode represented therein. Of course, other claims and combinations are provided too.

26 Claims, 16 Drawing Sheets
(15 of 16 Drawing Sheet(s) Filed in Color)

(56) References Cited

U.S. PATENT DOCUMENTS

| | | |
|---|---|---|
| 2015/0030201 A1 | 1/2015 | Holub |
| 2015/0156369 A1 | 6/2015 | Reed |
| 2020/0410312 A1 | 12/2020 | Holub |
| 2021/0142021 A1 | 5/2021 | Sedighianaraki |
| 2021/0248337 A1 | 8/2021 | Tu |
| 2022/0392244 A1 | 12/2022 | Bradley |

\* cited by examiner

COLOR DRIVEN LOCALIZATION OF 1D AND 2D BARCODES IN DIGITAL CAPTURE SYSTEMS

RELATED APPLICATIONS

This application is a continuation of U.S. patent application Ser. No. 17/339,582, filed Jun. 4, 2021 (U.S. Pat. No. 11,636,279), which claims the benefit of US Provisional Application Nos. 63/092,993, filed Oct. 16, 2020, and 63/037,569, filed Jun. 10, 2020, each of which are hereby incorporated herein by reference in its entirety. The present disclosure also relates generally to assignee's U.S. Pat. Nos. 10,650,209 and 10,198,648, which are each hereby incorporated herein by reference in its entirety.

TECHNICAL FIELD

The disclosure relates to advanced image signal processing technology including color-based localization for machine-readable indicia such as 1D and 2D barcodes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2C specifically shows a 2-dimensional (2D) barcode.

DETAILED DESCRIPTION

With constant improvement in smartphones (e.g., phones, tablets and other devices including digital cameras and one or more processors) and introduction of imaging checkout scanners (e.g., at grocery stores), the need for reading machine readable indicia from captured image data becomes more readily apparent; as does the need for rapidly locating machine-readable indicia within a captured image. Some forms of machine-readable indicia include 1D and 2D barcodes (e.g., QR codes, data glyphs, cryptographs), etc.

Figure 1:
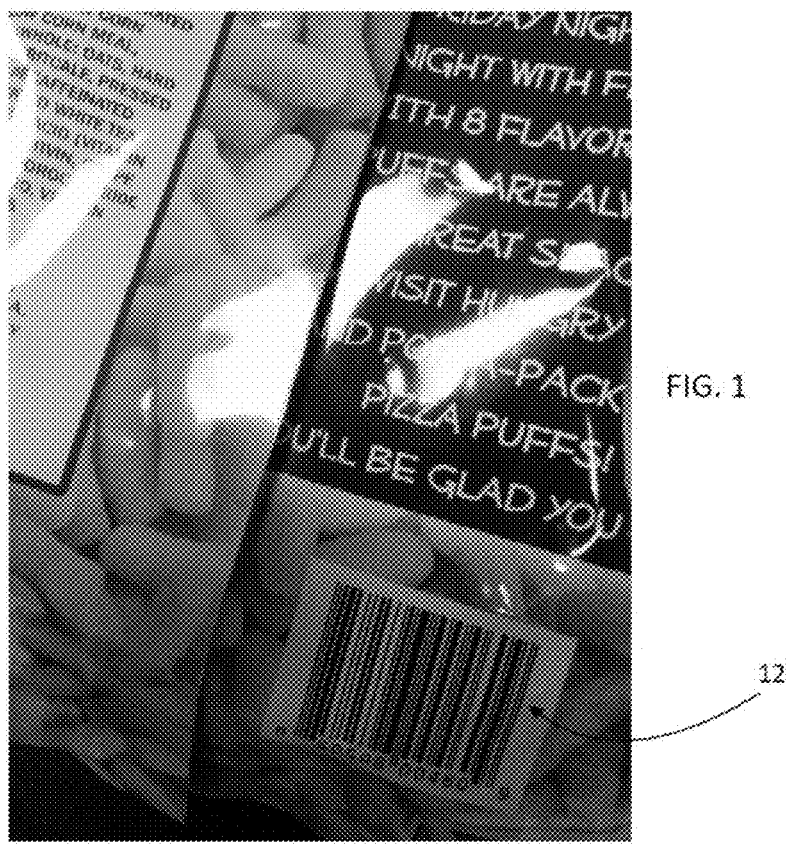
FIG. 1 is a color image captured with a camera, the image including a representation of a 1-dimensional (1D) barcode, specifically a UPC code.

In practice, some forms of machine-readable indicia, like barcodes, occupy a relatively small area of an image frame. For example, FIG. 1 shows an example frame of image data 10 including an area 12 in which machine-readable indicia is included (e.g., a 1D UPC barcode). Image data corresponding to area 12 may be captured e.g., with an image or video camera. In other cases, a barcode may be displayed on a screen or monitor display, and image data corresponding to the barcode may be optically captured. Since indicia readers may run on smartphones with limited time and processing budget per image frame, and limited battery life, it is important to localize any machine-readable indicia versus examining every image area for the indicia. The term "localizing" (and other forms of the word) is generally used in this document to mean locating, bounding, identifying and/or estimating or predicting digital image areas that likely include machine-readable indicia. A machine-readable indicia reader (e.g., a barcode decoder) can focus on localized areas identified as likely including machine-readable indicia, therefore saving precious computation time, vs looking at all image areas. For example, instead of directing a decoder at all image areas the decoder can focus initially on (or only on) those likely to include the indicia.

Additionally, in inventory management settings, retail configurations, store shelves, front of store checkout, and warehouse environments, it may be expected that multiple barcodes are located within an image frame. Localizing many barcodes dramatically increases the computational complexity as each may need to be quickly localized and decoded.

In this document, we describe, e.g., a novel approach to localization of machine-readable indicia in digital imagery (including video) using color driven localization. While the following sections specifically address 1D and 2D barcodes, our approach can be applied to other types of machine readable indicia such as digital watermarking, and can be used in icon detection and even fingerprint extraction.

Color Driven Barcode Localization

Figure 2A:
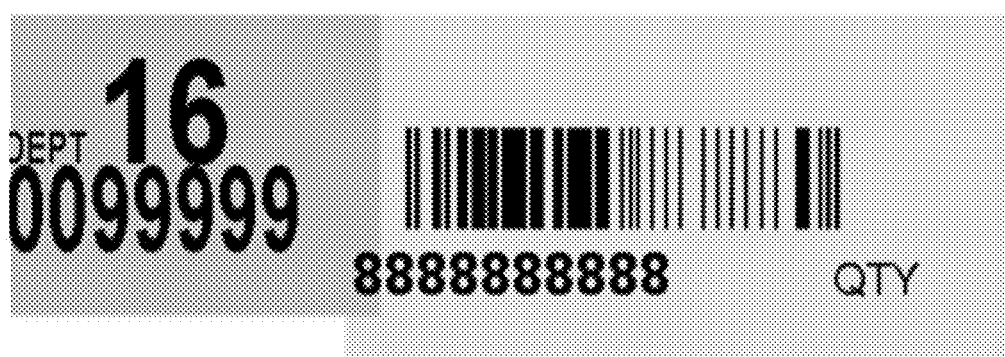
FIGS. 2A-2C show example barcodes and associated colors.

Some 1D and 2D barcodes are associated with one or more colors. For example, with reference to FIG. 2A, a 1D barcode overlays a first color (e.g., yellow) and is arranged near a second color (e.g., orange). In the illustrated case, the first color and second color are adjacently arranged, but needn't be so arranged. There may be accompanying text, e.g., associated with a date, department and/or inventory system. The first and second colors are provided as rectangles in the FIG. 2A arrangement, but may be provided as other shapes such as ovals, circles, triangles, trapezoids, octagons (or penta-, hexa-, hepta-gon, etc.), ellipses, rhombus, etc. The FIG. 2A arrangement shows the second color overlapping the first color, but it needn't do so.

Figure 2B:
Figure 2C:
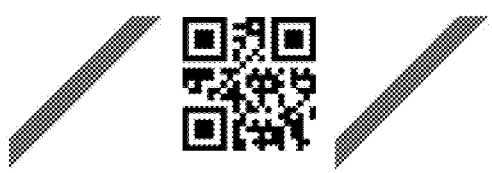

FIG. 2B shows another example, where a 1D barcode partially overlays a color patch (e.g., blue). FIG. 2C shows still another example where a 2D barcode is arranged between two color (e.g., green) slashes or diagonals.

Color can be searched within image data to help localize expected accompanying barcodes or other indicia (e.g., digital watermarking or even graphical icons).

Figure 3A:
FIG. 3A is an image of a target stand including multiple barcode labels that are generally in the FIG. 2A format.
Figure 3B:
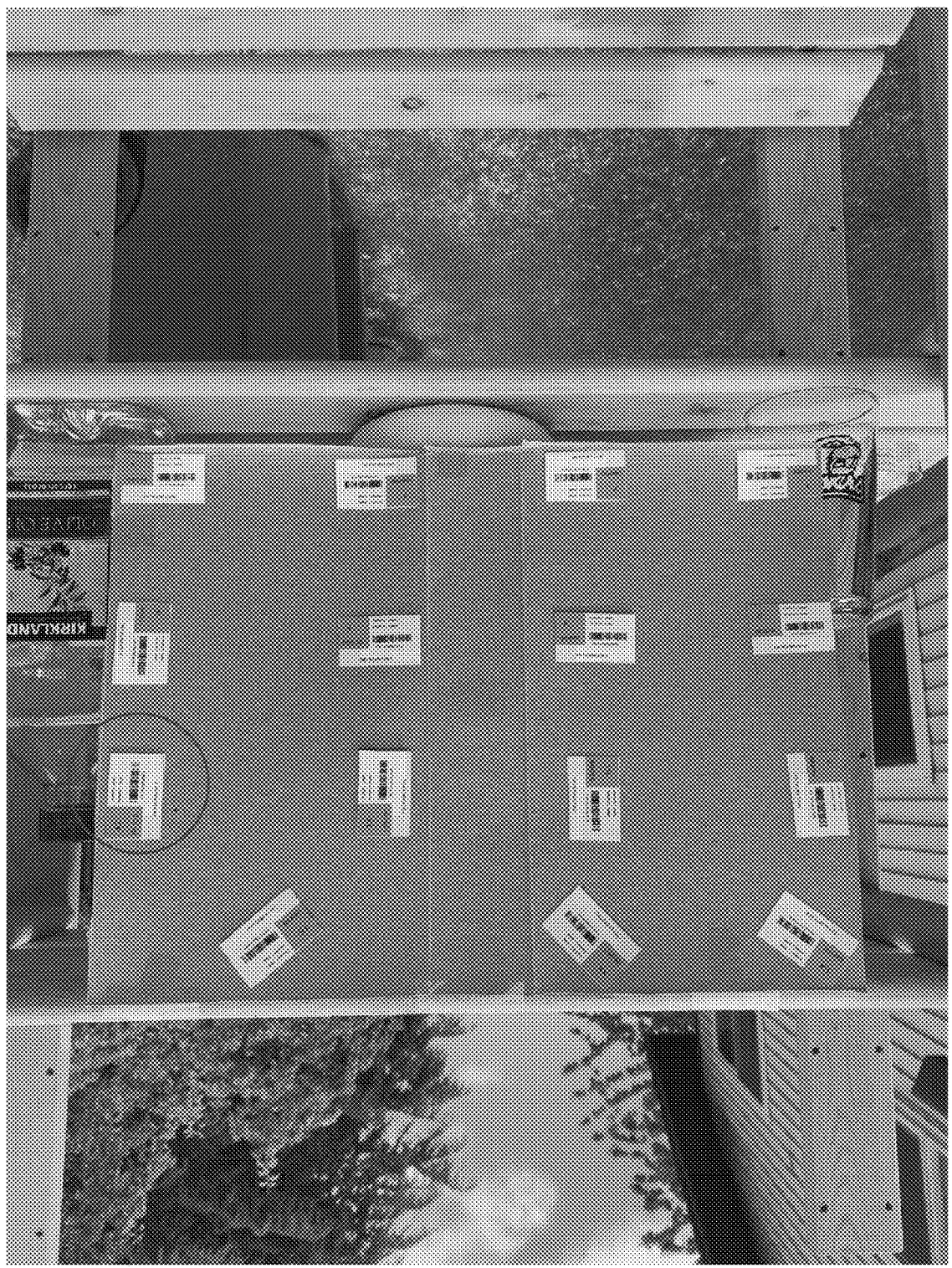
FIG. 3B shows the FIG. 3A image with one of the barcode labels highlighted.

A first implementation of our novel color driven barcode localization algorithm is discussed relative to a test image shown in FIG. 3A. The test image depicts many barcode labels arranged on a target stand. The test image has been converted to grayscale for illustration purposes except for 15 barcode labels (FIG. 3A), one of which is highlighted by a red circle (added for illustration only) in FIG. 3B. Each label includes a first color (yellow), a second color (orange) and a 1D barcode. The labels also include other text. These barcode labels are generally in the format shown in FIG. 2A.

Figure 12:
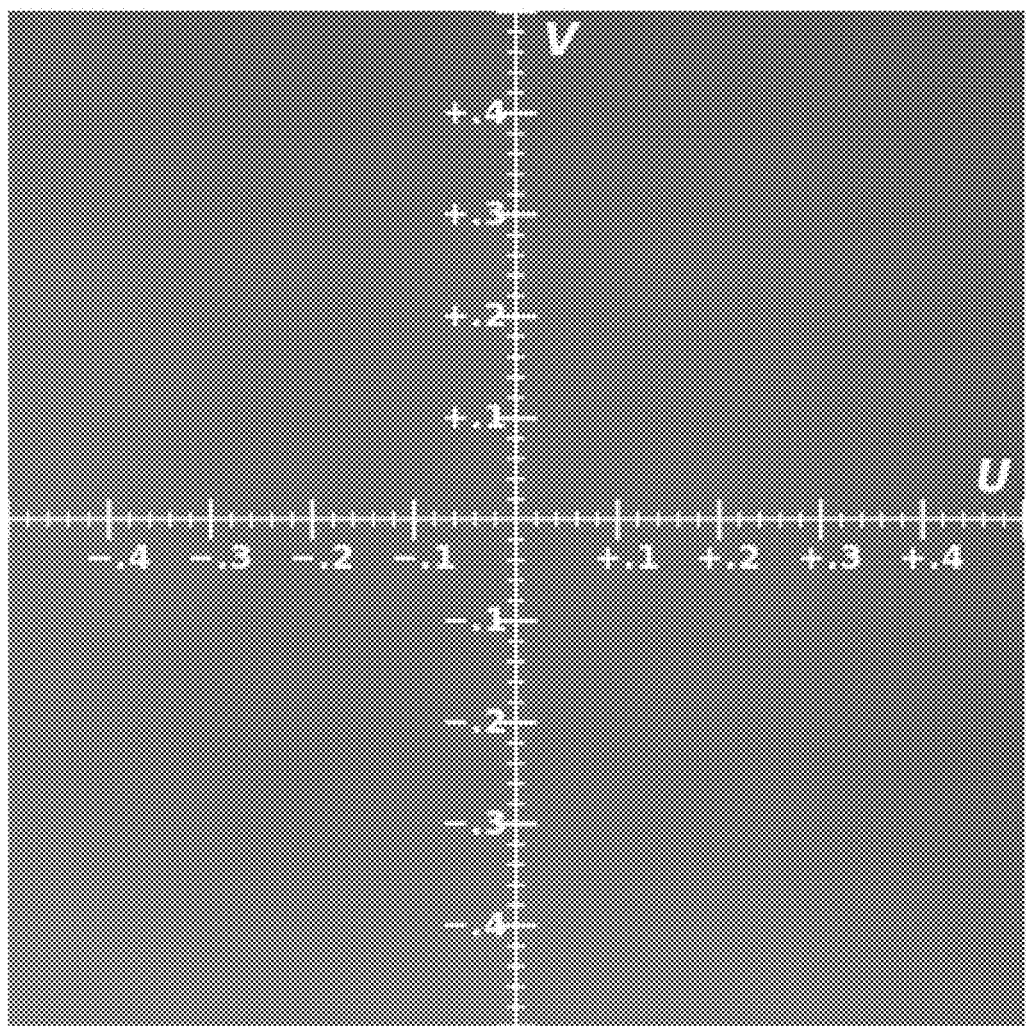
FIG. 12 shows a V, U color space at a given luminance (Y).
Figure 4A:
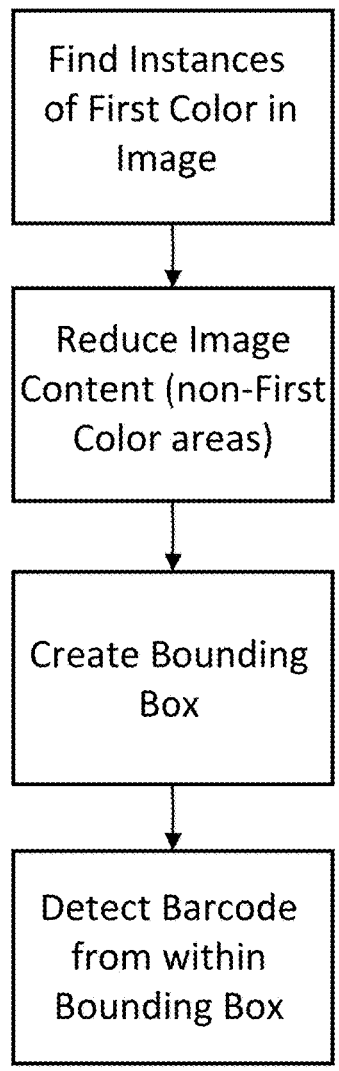
FIGS. 4A and 4B are flow diagrams corresponding to aspects of the disclosure.

With reference to the flow diagram in FIG. 4A, a first act finds instances of the first color (here, yellow) in the test image. One anticipated imaging environment is a smartphone, e.g., an iPhone or Android device. Camera systems and image pipelines on smartphone devices often employ a so-called YCbCr (or YUV) color space when handling captured pixel data. Y is the luminance component and Cb and Cr are the blue-difference and red-difference chroma components. We find that YCbCr and YUV are often interchangeable used, although technically YUV is analog and YCbCr is digital. For our purposes in this document, we will refer to either as YUV and intend that the following data manipulations to be carried out on digital data. The YUV model defines a color space in terms of one luminance component (Y) and two chrominance components, U (blue projection) and V (red projection). The YUV color space at a fixed luminance is shown in FIG. 12. If using a different color imaging space, e.g., RGB, thresholds and target values can be determined for such a color space. And, if looking for a color other than yellow, e.g., orange or blue, threshold numbers and target values can be determined for such.

A captured YUV image can be downsampled (e.g., 2× or 4×) to reduce processing time when looking for the first color. Acting on the downsampled test image, the image is processed to determine "yellowness" levels. For example, when using a 0-255 scale, on a per pixel basis:

Yellowness=(255−$U$)−2*(abs($V\_center$−$V$)).

V_center is a value representing a target color center. From observations of yellow within images captured we currently prefer V_center=132. However, a V_center value between 120-145 could be used depending on desired false positive levels. The yellowness value is compared to a predetermined threshold:

LocalizationMap=yellowness≥threshold.

The threshold is can be determined from test image observations and can be adjusted to allow for more or less false positives. We currently prefer a threshold of 170, although this could be adjusted ±25, or preferably ±10, and even more preferably ±5.

This methodology can also operate on blocks of pixels, e.g., 4×4, 8×8, 16×16, etc., with the block pixel mean or medium pixel value used as the evaluation number.

Figure 3C:
FIG. 3C shows padding or dilating of a detected yellow region.
Figure 3D:
FIG. 3D shows the FIG. 3A image with highlighting yellow regions not associated with barcode labels.

Areas identified as yellow can be dilated (e.g., 2-20 pixels) to establish extra padding and nearby non-yellow holes, e.g., caused by black barcode lines in the image, can be filled in or changed to yellow. For example, with reference to FIG. 3C, the area around an identified yellow patch can be expanded (shown with yellow hash marks). Areas identified as including yellow on the FIG. 3A target stand are shown in FIG. 3D. Three red circles are also included in FIG. 3D to show areas including yellow, but not corresponding to barcodes.

Figure 5A:
FIGS. 5A and 5B are heatmaps emphasizing yellow areas corresponding to the FIG. 3A image.
Figure 5B:
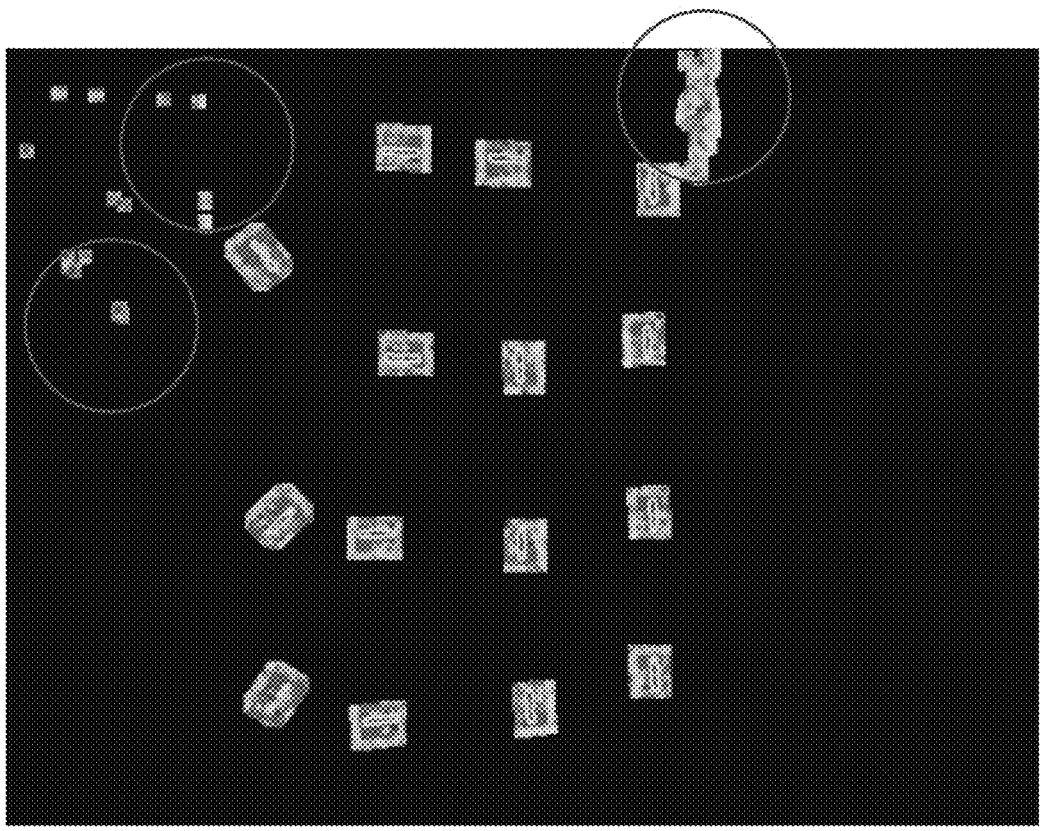

Returning to the flow diagram in FIG. 4A, Act 2 includes removing image content that does not correspond to identified yellow (or first color) areas. FIG. 5A shows a heat map of image content corresponding to FIG. 3A, with red corresponding to areas likely corresponding to the first color (here, yellow). FIG. 5B shows image content not corresponding to the (padded) first color removed from the heat map. The red circles shown in FIG. 5B correspond to the non-barcode yellow areas in FIG. 3D. Such areas are retained since they met the criteria discussed above in Act 1. Image content not corresponding to identified first color area can be masked out or removed in a copy. Or, alternatively, spatial locations (e.g., via image coordinates) of the areas can be accessed in following processing acts.

Figure 6A:
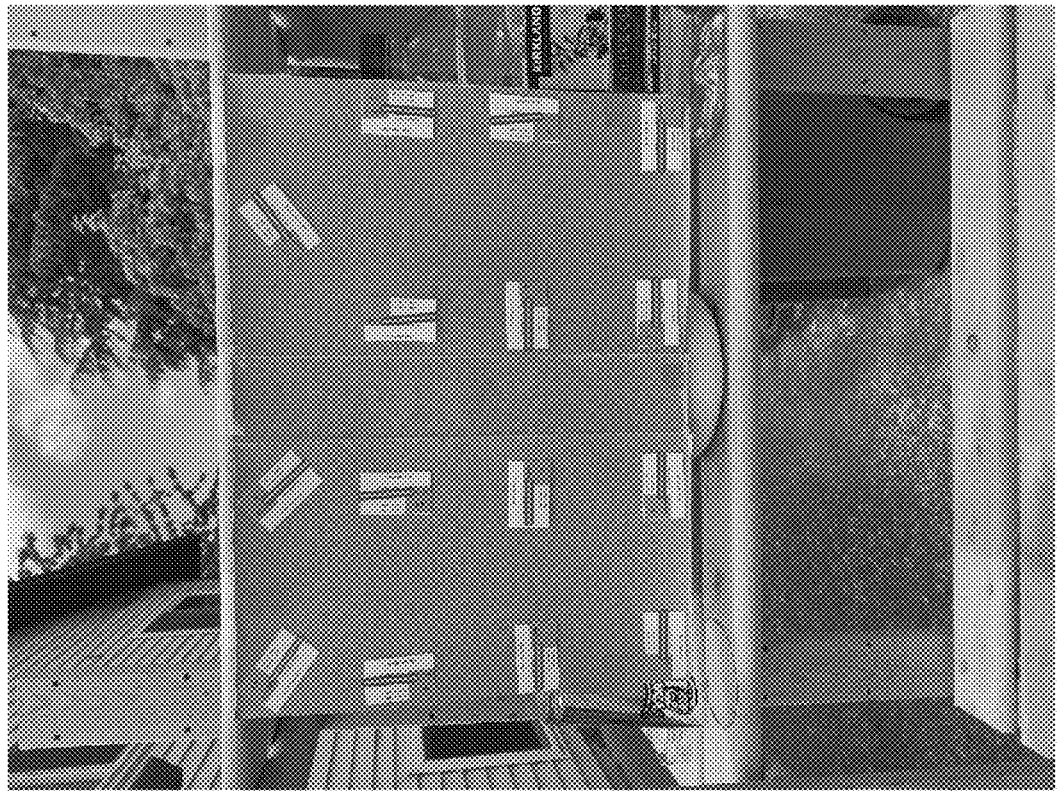
FIG. 6A shows bounding boxes around identified yellow areas.

Returning to the flow diagram in FIG. 4A, Act 3 includes creating a bounding box in each of the first color locations. Such a technique is discussed, below, in the Barcode Localization using Feature Extraction section. The goal here is to create a bounded area within which barcode detection will be carried out. In an alternative implementation, the padded first color area identified above forms the bounding box. FIG. 6A show virtual bounding boxes relative to each of the barcodes on the target stand. (There may be other bounding boxes established, but not shown in FIG. 6A, corresponding to the areas circled in FIG. 5B. Since these areas do not include barcodes, none will be found if later searched.)

Figure 6B:
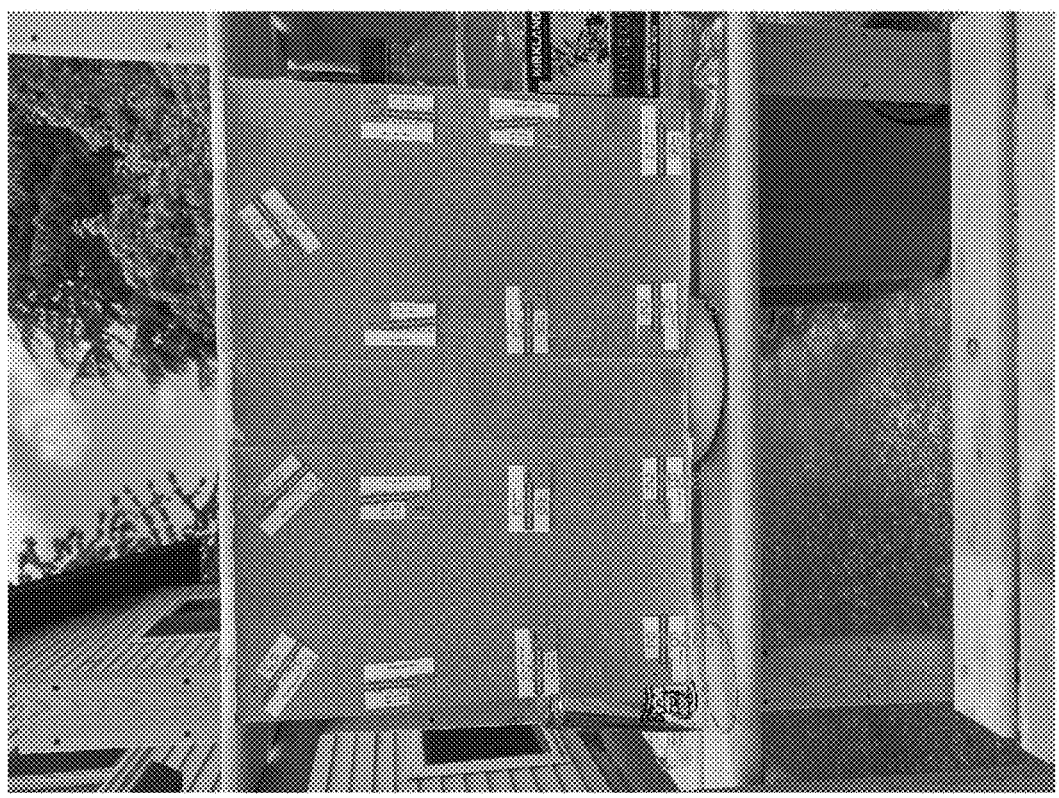
FIG. 6B shows identifiers decoded from within the bounding box imagery.

Finally, in Act 4, a barcode decoding operation is carried out on image data corresponding to the area within the bounding box. We prefer to access image data at the original resolution (prior to downsampling) when decoding a barcode. The technology described in Assignee's U.S. Pat. No. 10,198,648 can be focused in on such original resolution image data corresponding to the bounding boxes. In another embodiment, a barcode decoder such as ZXing ("Zebra Crossing"), the open source code of which is found at https://github.com/zxing/zxing, is provided image data from the bounding boxes for evaluation. Resulting decoded barcode identifiers, e.g., see FIG. 6B, can be provided, output or displayed.

To improve false positives in some implementations, a resulting decoded barcode is only provided, output or displayed when two (2) or more identical identifiers are decoded from the same bounding box area in the last 5-20 image frames. For example, the same identifier must be successfully decoded from the same bounding box area in the last 5, 8, 10, 12, 15 or 20 frames.

Now consider an implementation that uses two or more colors to help localize a 1D or 2D barcode. For example, consider the label including a 1D barcode shown in FIG. 2A, which includes a first color (e.g., yellow) and a second color (e.g., orange). A 1D barcode is located within the first color. Image frames corresponding to the FIG. 3A target stand are captured for analysis.

Figure 4B:
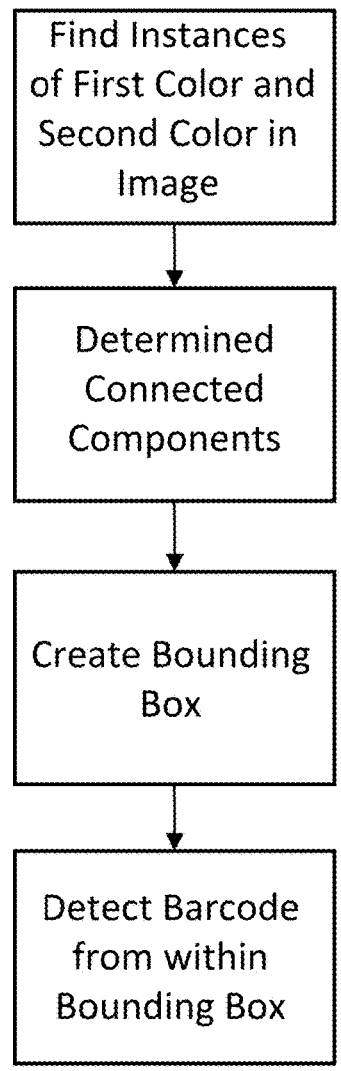

With reference to FIG. 4B, a first act locates or finds first color (in this example, yellow) and second color (in this example, orange) regions in downsampled U and V color planes coming from an imaging sensor (e.g., a smartphone image sensor carried by an iPhone or Android device). The identification of the first and second color regions is preferably carried out independently of one another, but need not be.

Figure 7A:
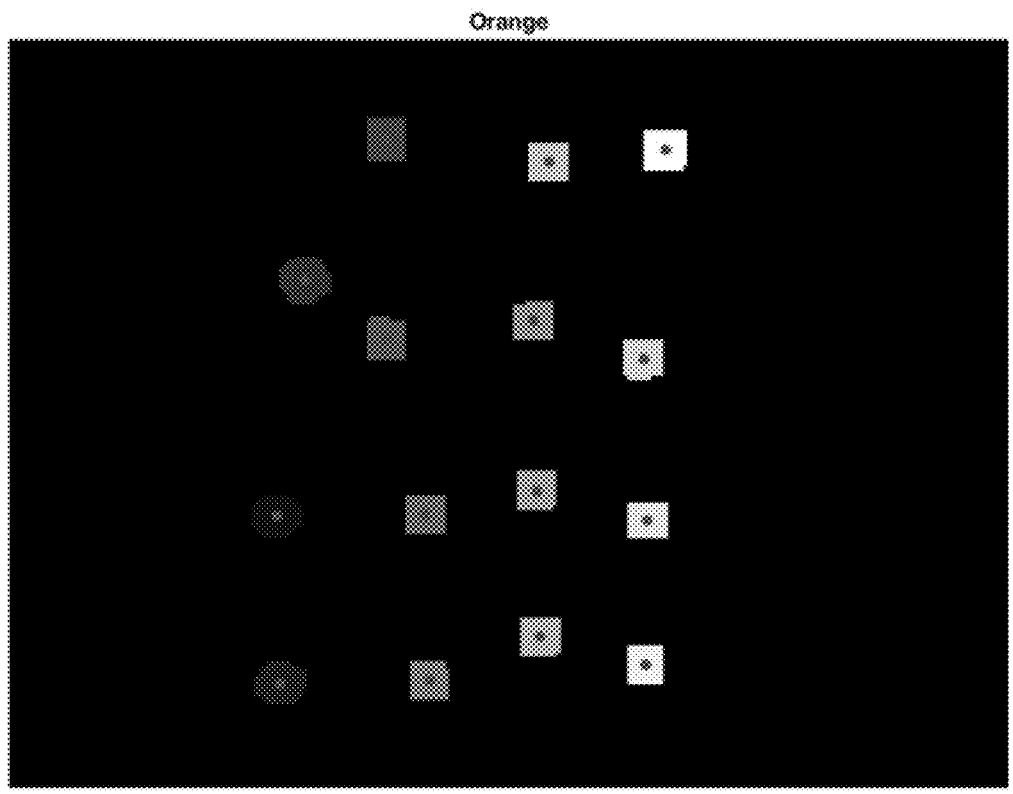
FIG. 7A shows orange regions identified in the FIG. 3A image.

For orange regions within an image frame, only the V channel is used, and a thresholding formula may include:

abs(180−$V$)<15, where V is the pixel value or pixel block average value. Basically all pixels in the V plane that are within a 15 point intensity of 180 up or down are considered orange. Instead of a 15 point intensity, we can alternatively use a 7-25 value point; and instead of 180 we could use 160-195. Based on analysis of the FIG. 3A image, FIG. 7A shows image regions identified as second color regions (in this implementation, orange).

Figure 7B:
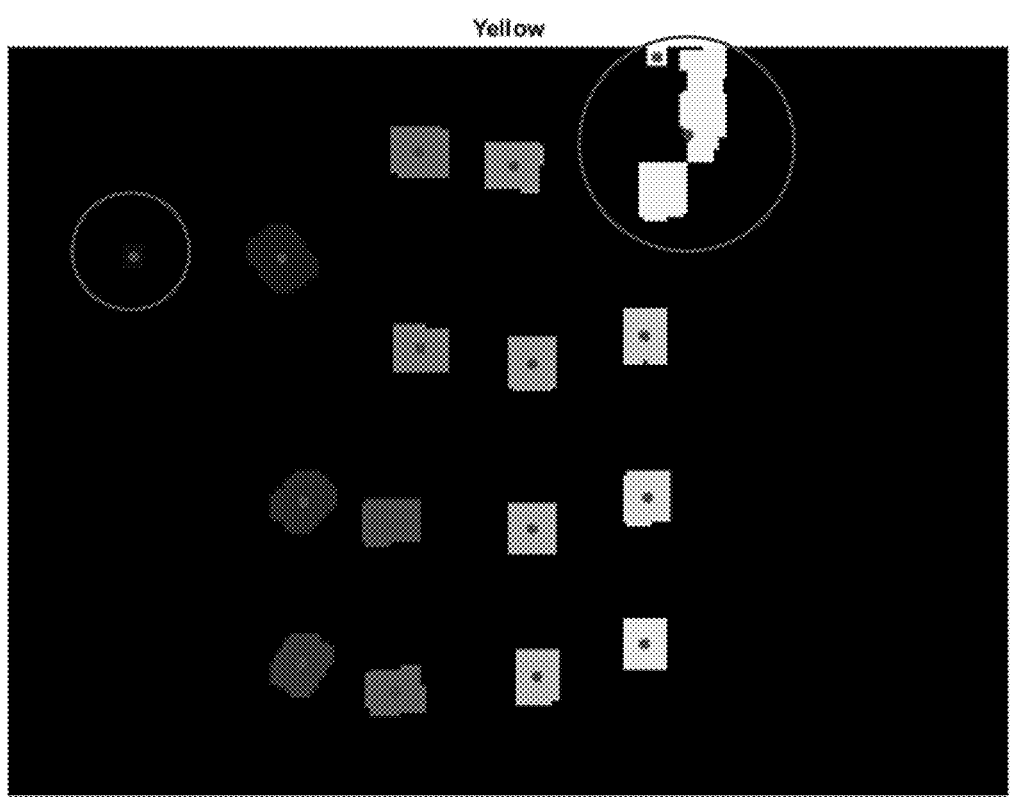
FIG. 7B shows yellow image areas identified in the FIG. 3A image.

For second color regions (in this implementation, yellow) within the image frame, we use both U and V planes and a thresholding formula may include:

$$(255-U)-(2*abs(132-V))>150,$$

where V and U are corresponding V or U plane pixel values or pixel block average values. Based on analysis of the FIG. 3A image, FIG. 7B shows image regions identified as first color regions (in this implementation, yellow). Of course, the 150 intensity could instead be a value of 130-175, or more preferably 140-170, or even more preferably 140-160. Here the pixels with U components as dark are preferred and V components as close to 132 will be determined as yellow. Instead of 132, we could use a value of 120-145, or more preferably, 125-140. And, of course, instead of the dark 255 value, we could use a value of 235-255, more preferably 240-255, and even more preferably 245-255.

After identifying yellow and orange regions, a connected component process is carried out. For this process, a centroid and area of each identified first color region and second color region is determined. A centroid is determined for each region (both first and second color regions). The red dots in FIGS. 7A & 7B each represent a centroid of its respective identified region. (A "centroid" is a central point or area of a region and is sometimes called the region's "geometric center". It may include a point or area which corresponds to the mean position of all the other points in a region.) One way to calculate a centroid is to use functions provided in software programs, for example, in MatLab, [x,y]=centroid (polyin) returns the x-coordinates and the y-coordinates of the centroid of a polyshape, and [x,y]=centroid(polyin,I) returns the coordinates of the centroid of the Ith boundary of polyin. There are many other ways to find a centroid including, e.g., integration over an area or shape.

The area of each region is also determined, e.g., by a pixel count within the region or through shape fitting approximation (e.g., fitting a region to a rectangle), etc.

Figure 8A:
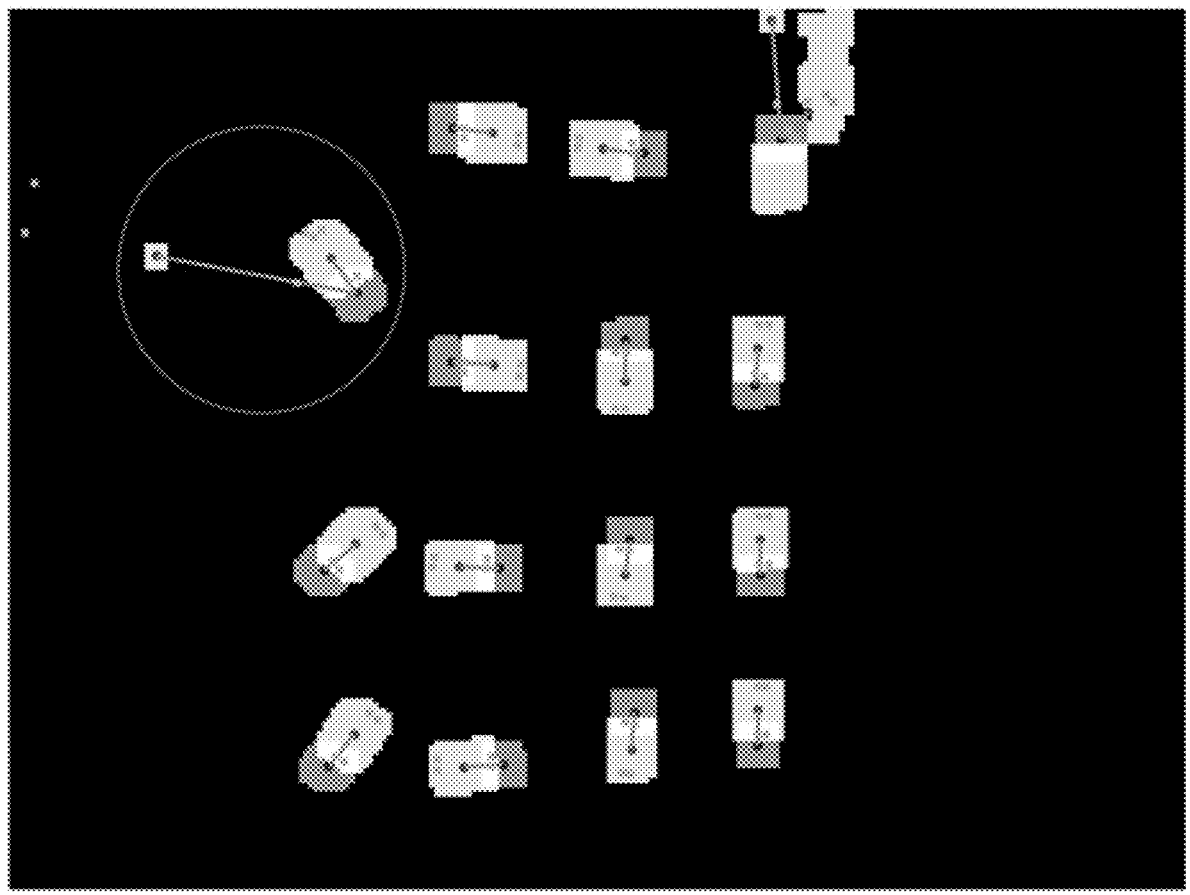
FIGS. 8A and 8B show yellow and orange region couples, including centroid distances between such.

Using these two features, centroids and areas, one or more characteristics can be evaluated to determine which areas to keep for barcode decoding. For example, a metric is determined and compared to an expected distance between orange and yellow centroids and their respective area ratio. This facilitates associating a yellow region with its neighboring orange centroid. In an exhaustive search implementation, a distance between each orange centroid and each yellow centroid is determined. A centroid distance and area ratio (e.g., a combination, sum or product of the centroid distance and yellow/orange area ratio or orange/yellow area ratio) of each yellow and orange color couple can be compared against a threshold to determine which couple is the best match. Using a ratio helps make the metric scale independent. In a more streamlined approach, only the shortest 2-5 yellow and orange color couple centroid paths are evaluated. For example, consider FIG. 8A, where the red circle shows two centroid path evaluations. The longer green path connects a small yellow regions to an orange region. The centroid distance and area ratio of this couple does not meet an expected metric. The shorter centroid distance and ratio does, however, fit the criteria.

Figure 8B:
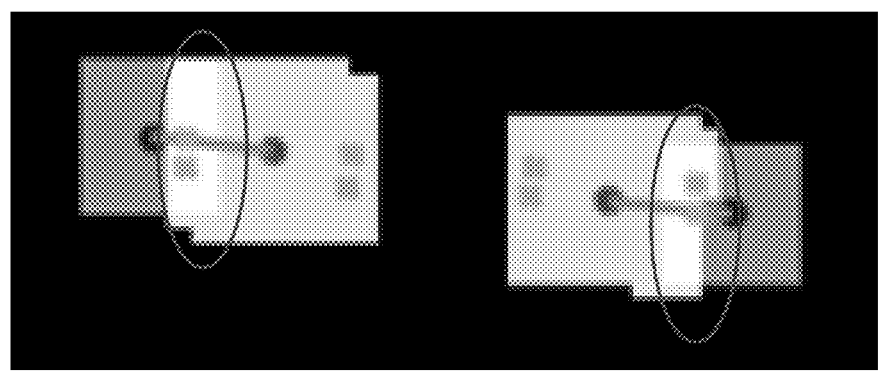

In another implementation, each of the identified first color and second color areas are dilated or padded with extra pixels (e.g., 2-20 pixels). In other words, the first and second color region boundaries are expanded. With reference to FIG. 8B, the dilated yellow and orange regions overlap. This overlap is shown as the white areas circled in red. The perimeter or boundary pixels of one color region (yellow or orange) can be traced or evaluated to determine whether any overlap with the other color region (orange or yellow). If an overlap occurs, the color couple is flagged to process further (e.g., to create a bounding box). If more than one orange region having a centroid is identified in this overlapping boundary process, then a characteristic is determined for each color couple. For example, a ratio yellow area/orange area (or orange/yellow) can be compared against a predetermined threshold. If using a FIG. 2A label, a yellow/orange ratio in the range of 1.4-1.8 can be used to determine an expected color couple. More preferably a ratio in the range of 1.5-1.7 can be used. Or, the color couple with the closest ratio to a value within an above range (e.g., 1.4-1.8, like 1.6) will be retained for further processing.

Figure 9:
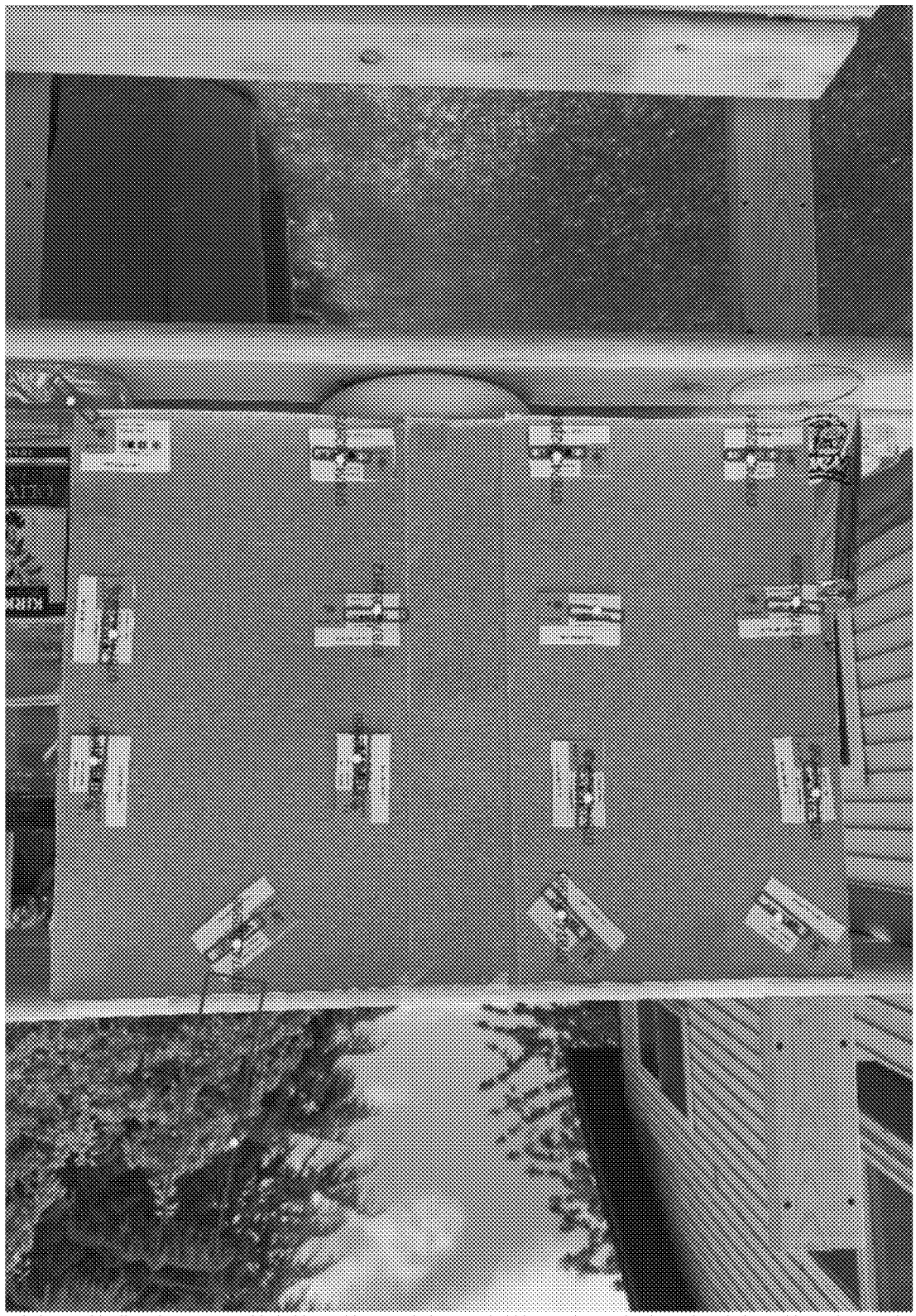
FIG. 9 shows bounding boxes on barcode labels and decoded barcode identifiers.

Returning to FIG. 4B, a bounding box (Act 3) is established around the color region expected to include a barcode, in this case, yellow. In one implementation, the boundary of the yellow region is used as the bounding box. In another implementation, after a slight rotation (e.g., −2 to −16 degrees, e.g., −6 degrees) of each orange centroid around its yellow counterpart to compensate for the relative shift between the two color regions, and then using the distance between the two centroids as a measure of scale relative to an expected distance (e.g., the centroid distance of the label shown in FIG. 2A), we find the coordinates of a bounding box for each barcode. For example, the bounding box can be established in the height dimensions of the orange area with a width from the orange centroid toward and past the yellow centroid along a predetermined distance, e.g., 3-5 orange region shifts. FIG. 9 illustrates resulting bounding boxes from which image data can be searched to find a 1D or 2D barcode. For example, the technology described in Assignee's U.S. Pat. No. 10,198,648 can be focused in on image data corresponding to the bounding box. In another embodiment, a barcode decoder such as ZXing ("Zebra Crossing"), the open source code of which is found at https://github-.com/zxing/zxing, is provided image data from the bounding box for evaluation. Resulting decoded barcode identifiers, e.g., see FIG. 9, can be provided, output or displayed. For example, they can be displayed on a smartphone display.

To improve false positives in some implementations, a resulting decoded barcode is only provided, output or displayed when 2 or more identical identifiers are decoded from a bounding box area in the last 5-20 image frames. For example, the same identifier must be successfully decoded from the same bounding box area in the last 8, 10, 12, 15 or 20 frames.

Returning to FIG. 7B, the two red circles indicate identified yellow regions that do not correspond to barcodes. The top right circle shows how this non-barcode area may influence centroid determination, by placing the centroid in the non-barcode area vs. the actual barcode area. One way to address this is to compare an identified area with other identified areas. If its area differs by more than 5%-15%, it can be discarded. As shown in FIG. 9, a resulting bounding box around this area would otherwise not include a barcode located therein. If we have to error, however, we prefer to keep identified areas and analyze more image data than less image data in hopes of capturing all barcodes.

Pre-Classifier for Barcode Localization

A pre-classifier can be utilized to improve efficiencies. For example, there may be some modes of operation that require, or perform better, when higher-resolution imagery is operated on to locate a barcode, e.g., without any down-sampling. For example, imaging items at distance (e.g., 4 feet and beyond). Such an image may have 10, 12 or more million pixels per frame.

Figure 13A:
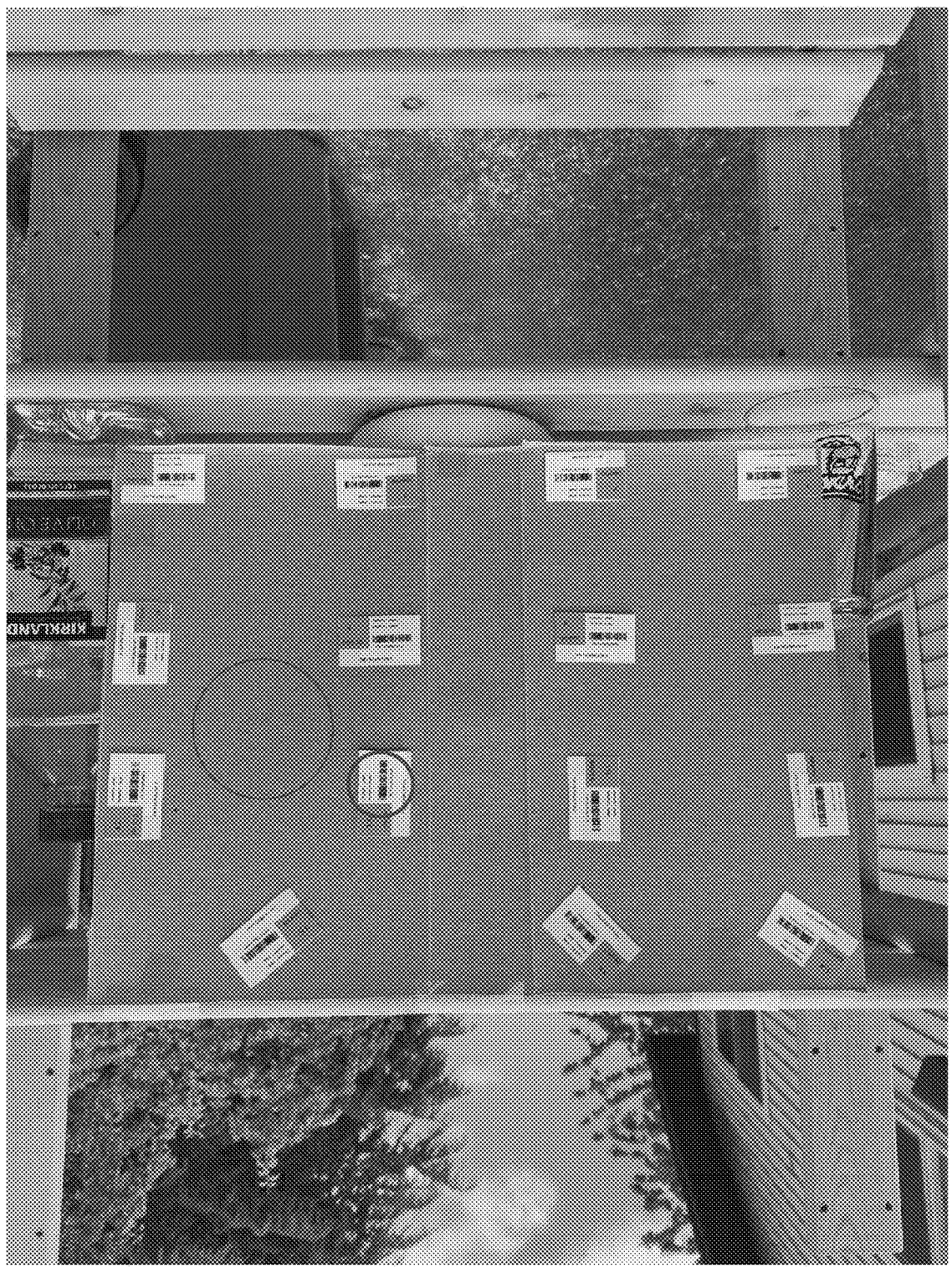
FIGS. 13A and 13B is the FIG. 3A image with various areas highlighted.

One approach analyzes image data to determine pixel diversity within the image or blocks within the image. For example, flat or smooth areas that are unlikely to include variation or pixel diversity, e.g., white and dark areas of a barcode. With reference to FIG. 13A, an area of cardboard that is flat is shown within the red circle. That means that there is little to no pixel diversity in this area. In contrast, the blue circle below and to the left of the red circle, encloses an area with includes variation, e.g., includes black lines and white spaces of a 1D barcode.

Figure 13B:
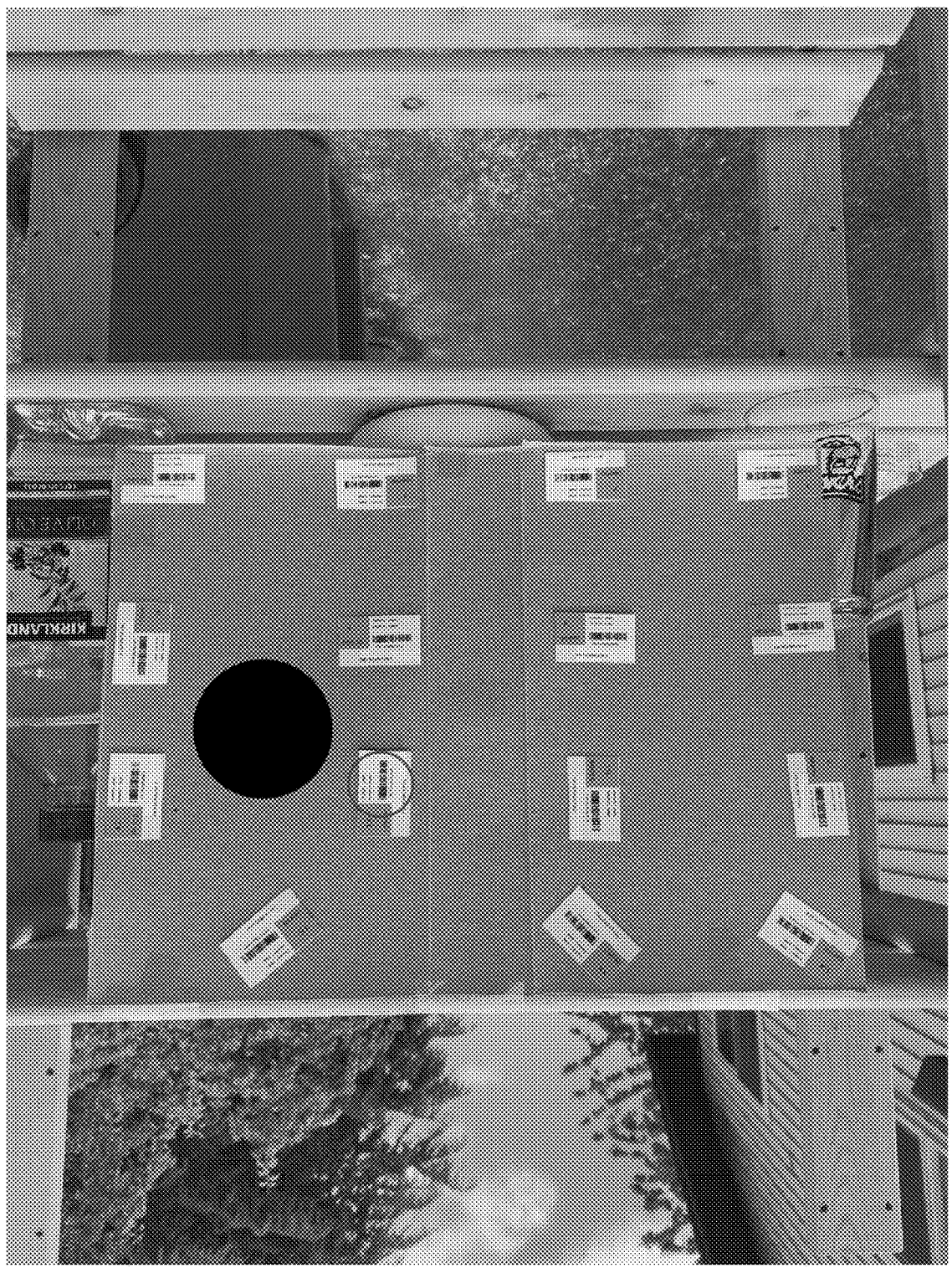

A first way to implement this approach evaluates areas across the image, or a greyscale version of the image, to determine if there is variation with the area. In this second implementation, the area comprises a 64×64 pixel block. (Of course, we could vary the size of this block, and instead choose an 4×4, 8×8, 16×16, 32×32, 128×128, or 256×256 pixel block.) Variance within the block is determined. A variance of zero would indicate that all of the pixel values are identical. A high variance indicates that the pixel values are very spread out from the average. Variance can be computed as the average of the squared distances from each pixel value to the mean pixel value. The process includes: (1) Determine the average pixel value of the 64×64 pixel block; (2) Subtract each pixel value from the average pixel value determined in (1) to find its distance from the average; (3) Square all distances determined in (2). (4) Add all the squares found in (3) of the distances. (4) Divide by the number of pixels in the block (here, 64). The variation value can be compared against a threshold to determine whether to keep or discard the block. In FIG. 13B, the flat area previously shown in FIG. 13A, can be masked out or otherwise excluded from barcode localization if it has too low of a variance relative to a predetermined threshold.

A second way to implement the approach evaluates areas across the image, or a greyscale version of the image, to determine if there is variation with the area. In this second implementation, the area comprises a 64×64 pixel block. (Of course, we could vary the size of this block, and instead choose an 4×4, 8×8, 16×16, 32×32, 128×128, or 256×256 pixel block.) The dynamic range of this 64×64 pixel block is determined. That is, we determine the highest pixel value in the block, and the lowest pixel value in the block, and seek their difference. If the dynamic range is below a threshold, e.g., in the range of 15-50, more preferably in the range of 20-35, and even more preferably, 25, then block contents are excluded from barcode localization. Typically, for a gray-scale image, zero (0) is taken to be black, and 255 is taken to be white. So in the perfect case, a 64×64 block including a 1D barcode bar and space would have a dynamic range of 255. Of course, we don't live in a perfect world when using smartphones to capture images at distances, so the dynamic range will typically be much less when viewing a captured barcode. In FIG. 13B, the flat area previously shown in FIG. 13A, can be masked out or otherwise excluded from barcode localization if it lacks the appropriate dynamic range value relative to a predetermined threshold.

Binarized Scanlines

Figure 14:
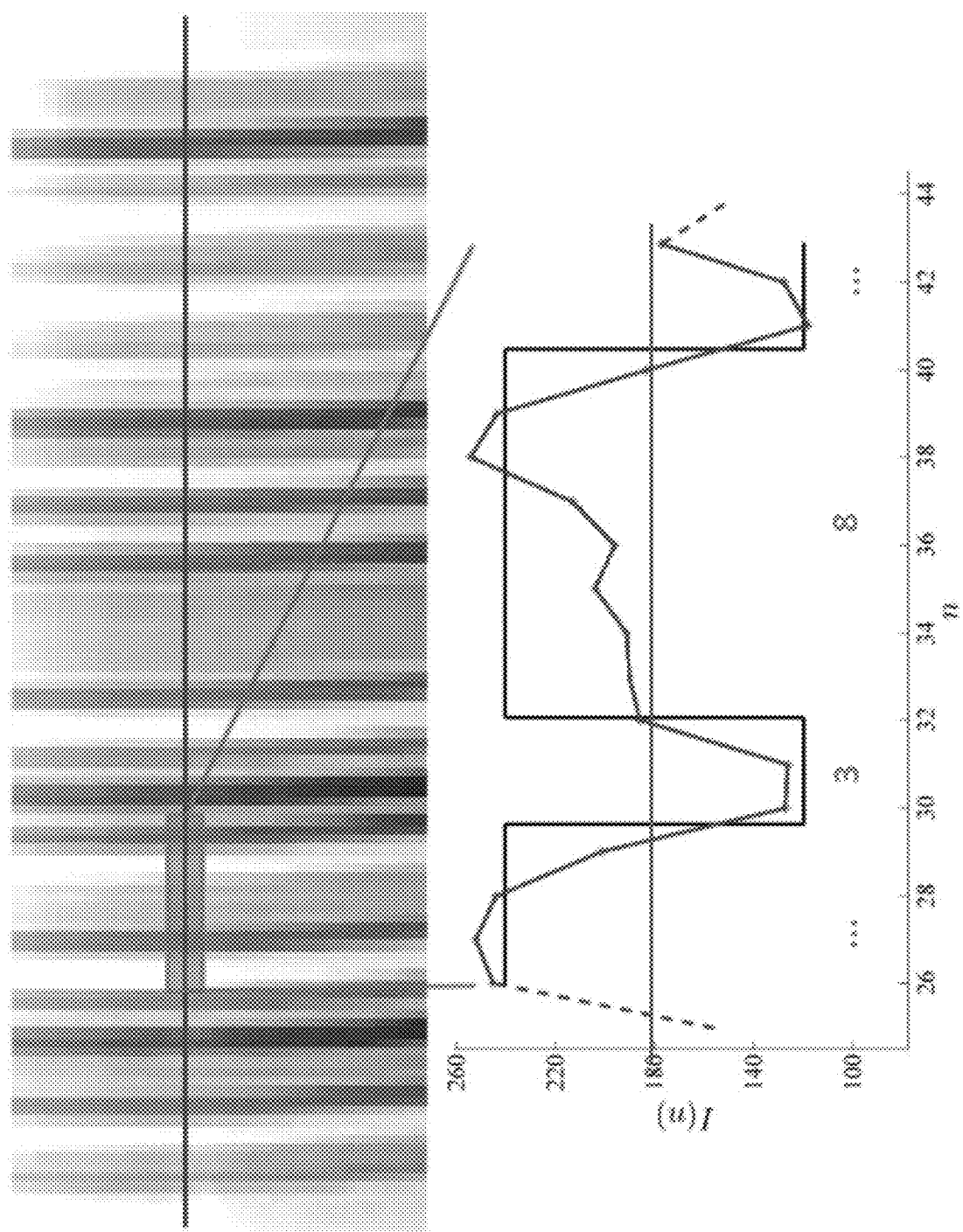
FIG. 14 shows an optically captured barcode and related waveforms.

We can binarize and modify scanlines through a 1D barcode to make them more robust for decoding. As used in this disclosure, a "scanline" represents a stripe or row of image data. A blue scanline is show relative to a 1D barcode in FIG. 14 (top). Values along the scanline can be represented as a waveform (blue line in graph, bottom) as shown in the same figure.

To binarize the scanline, a threshold value is used to separate black from white. In the FIG. 14 example, we choose 180. However, the threshold value can change depending on image capture conditions, and detection requirements. For example, the threshold may fall within the range 160-200. The scanline (blue line) is binarized (into the black line in graph) based on the threshold. The binarized scanline can optionally be run-length encoded. A further improvement is to multiple each length of the binarized wave form by a constant value to help recognize transition points. For example, the constant can be 2.5, 5, 8, 10, 12, 15 or 20. So, if we choose as an example an easy-to-multiple scalar value of 10, the middle black/white values would become 30 and 80, respectively.

Reading a barcode at a distance is difficult, resulting in reduced scale. In some cases, barcode decoding on binarized scanlines operates by comparing lengths of binarized segments. For example, if you denote white as "W" and black as "B", pixels such as WWWBBBBBBWWW would become simply 3:6:3 and it is recognized that it contains a black line that is roughly twice the length of the white lines around it.

Now consider a specific example, when reading at distance, resolution is 4 times smaller (e.g., image capture occurred at 4 times the distance of a baseline capture). The above 3:6:3 example would then be recognized as 0.75 W, 1.5 B and 0.75 W. But most barcode decoders operate on integer values (1, 2, 3 . . . ). So there is a chance that a binarizer or decoder will convert 0.75:1.5:0.75 to 1:1:1. This would result in a black line roughly the size of its surrounding white spaces, and that could represent an entirely different barcode symbol. Instead of sending these scanline values directly to a decoder, we can scale their values by, e.g., 2.5, 5, 8, 10, 12, 15 or 20. Using the same easy-to-multiple example scalar, 10, 0.75:1.5:0.75 converts to 7:15:7, which brings us much closer to the original ratio.

The scaled, binarized scanline can be input into a barcode decoder, e.g., as described in assignee U.S. Pat. No. 10,198,648 (see, e.g., the BARCODE DECODING section), which patent is hereby incorporated herein by reference in its entirety. Alternatively, the binarized scanline can be analyzed by other barcode decoders, e.g., ZXing ("Zebra Crossing"), the open source code of which is found at https://github.com/zxing/zxing.

Barcode Localization Using Feature Extraction

The following technology employs machine learning (e.g., feature extraction, classification, etc.) to localize barcodes and to determine an alignment angle of a localized barcode within imagery. In the following examples, machine learning is used for localization of a 1D UPC barcode within captured imagery. Of course, classifiers can be trained to localize other types of machine-readable indicia including other 1D barcodes and 2D barcodes (e.g., EAN8/EAN13, QR Codes, Datamatrix, PDF417, ITF, Code 39, Code 93, Code 128, MSI Plessey, GS1 Databar, GS1 QR Code, and Aztec, etc.)

Feature Set

One component of our barcode localization includes an edge orientation sensitive feature set. Given a grayscale image (or image patch) X of dimensions M×N (M rows, N columns, both dimensions are multiples of $p \in N$ for simplicity), the feature set can be computed using the following steps:
1. The image X can be downsampled by a factor of p using, e.g., nearest-neighbor downsampling (e.g., it can be faster to process an image with $p^2$ times less pixels) to X'. Other downsampling technology, e.g., bilinear, bicubic, etc. can be alternatively used.
2. Image X' can be convolved * (or, alternatively, cross correlated, dot product processed, etc.) with, e.g., 4 directional filters $F^V, F^H, F^D, F^M$ (vertical (V), horizontal (H), diagonal (D), minor diagonal (M))

$$F^V = \begin{pmatrix} 0 & 0 & 0 \\ 1 & -2 & 1 \\ 0 & 0 & 0 \end{pmatrix}, F^H = \begin{pmatrix} 0 & 1 & 0 \\ 0 & -2 & 1 \\ 0 & 1 & 0 \end{pmatrix},$$

$$F^D = \begin{pmatrix} 0 & 0 & 1 \\ 0 & -2 & 0 \\ 1 & 0 & 0 \end{pmatrix}, F^M = \begin{pmatrix} 1 & 0 & 0 \\ 0 & -2 & 0 \\ 0 & 0 & 1 \end{pmatrix}$$

to create 4 residual matrices:

$$Z^V = X'*F^V, Z^H = X'*F^H, Z^D = X'*F^D, Z^M = X'*F^M$$

3. Values in the residual matrices $Z^S$, $S \in \{V, H, M, D\}$ are quantized (e.g., divided or multiplied) by q, an integer, rounded and truncated so that the values of $R^S$ are in $\{-T, -T+1, \ldots, T\}$. Formally, $$R^S_{i,j} = trunc_T\left(\text{round}\left(\frac{Z^S_{i,j}}{q}\right)\right), \forall S \in \{V, H, M, D\},$$

$$\forall i \in \left\{1, \ldots, \frac{M}{p} - 2\right\}, \forall j \in \left\{1, \ldots, \frac{N}{p} - 2\right\},$$

where i,j are indexes of the matrices $Z^S$ and truncation is defined as $$trunc_T(k) = \begin{cases} T & \text{when } k \geq T \\ k & \text{when } -T < k < T \\ -T & \text{when } k \leq -T \end{cases}$$

4. For each coordinate i $$\in \left\{1, \ldots, \frac{M}{p} - 2\right\}, j \in \left\{1, \ldots, \frac{N}{p} - 2\right\},$$

values can be computed for index matrix: $I_{i,j} = 1 \cdot (R_{i,j}^V + T) + (2T+1) \cdot (R_{i,j}^H + T) + (2T+1)^2 \cdot (R_{i,j}^D + T) + (2T+1)^3 \cdot (R_{i,j}^M + T)$.

This index matrix now contains a unique number between 0 and $(2T+1)^4 - 1$ for each possible combination of quadruplet $(R_{i,j}^V, R_{i,j}^H, R_{i,j}^D, R_{i,j}^M)$. Given the nature of the following classifier, we can work directly on the index matrix.

5. Optionally, the final feature set obtained from the image X is the histogram of index matrix I divided by the number of elements in I. Formally, $$f(X) = \frac{hist_0^{(2T+1)^4-1}(I)}{\left(\frac{M}{p} - 2\right) \cdot \left(\frac{N}{p} - 2\right)},$$

and the dimensionality of f(X) is $(2T+1)^4$.

All the parameters, including the directional filters, can been empirically selected based on, e.g., testing errors, computational requirements, etc. Our current preferred parameter values include:

downscaling factor, e.g., p=8; or p=round($\sqrt{\text{image\_pixels}/512}$)

quantization step q=16 truncation threshold T=2

The dimensionality of the resulting feature set is $5^4 = 625$. Of course, other values and dimensionalities can be selected based, e.g., on acceptable error tolerance, computation requirements, etc.

Classification

We can use a probabilistic statistical classification model, e.g., logistic regression, as a classifier for machine-learning training. For a given vector $w = (w_1, \ldots, w_{625})$ and feature vector $x = (x_1, \ldots, x_{625})$ extracted from image X, $x = f(X)$, the probability p(x) that the image from which the feature vector is extracted is a barcode image can be defined as:

$$p(x) = \frac{1}{1 + e^{-w \cdot x^T}}, w \cdot x^T = \sum_{i=1}^{625} w_i x_i$$

Figure 10:
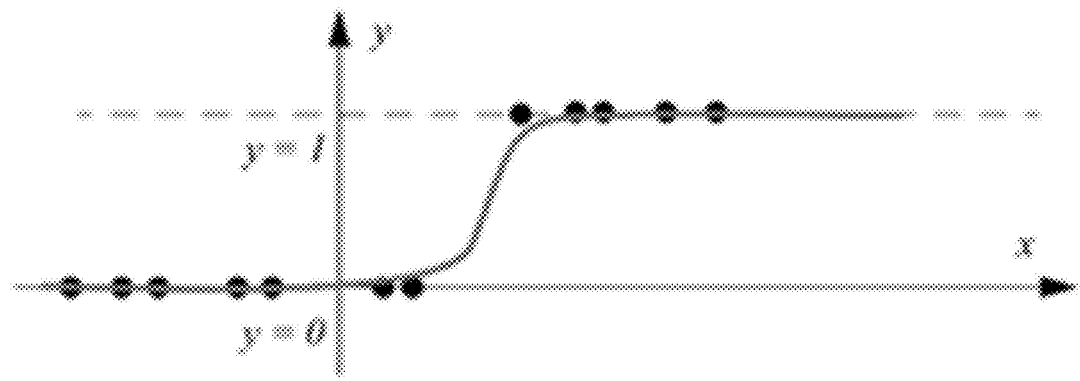
FIG. 10 shows an example of 1D logistic regressor.

Logistic regression can also be used as a linear binary classifier by saying that if p(x)>0.5 then the image is an image of a barcode. This condition corresponds to $w \cdot x^T + w_0 > 0$. The logistic function example for a one dimensional case for a given w can be seen in FIG. 10. We can say that images not containing barcode have label y=0 while barcode images are assigned a label of y=1. As a practical implementation note, and for barcode segmentation, the probability is not critical and the exponential function need not be computed. More interesting is finding the maximum probabilities, which relates, e.g., to finding the largest dot product $w \cdot x^T$.

Classifier Training

The vector w can be used for linear regression and can be determined by a training phase. In practice, for a given barcode format, training can be carried out once (or updated, if desired). The vector w determines an orientation of a decision boundary in feature space. In one implementation, training can be performed using an open source "libSVM" library downloadable at http://www.esie.nut.edu.tw/-cjlin/libsvm/. Implementation details of the LIBSVM, including solving SVM ("Support Vector Machines") optimization problems, theoretical convergence, multiclass classification, probability estimates and parameter selection are detailed in Chang, C.-C. and Lin, C.-J. 2011, "LIBSVM: A library for support vector machines," ACM Trans. Intell. Syst. Technol. 2, 3, Article 27 (April 2011), 27 pages, which is hereby incorporated herein by reference in its entirety. In another implementation, the "LibLINEAR" open source library can be used for training. LibLINEAR is described, e.g., in i) R.-E. Fan; K.-W. Chang; C.-J. Hsieh; X.-R. Wang; C.-J. Lin, "LIBLINEAR: A library for large linear classification," Journal of Machine Learning Research 9: 1871-1874 (2008), and ii) Fan et al., "LIBLINEAR: A library for large linear classification," Journal of Machine Learning Research 9: 1871-1874 (2008) (as last modified: Aug. 23, 2014), which are each hereby incorporated herein by reference in its entirety.

Multiple Classifiers

In the current implementation of our barcode localization technology, we preferably use a plurality of trained classifiers, e.g., 17 trained classifiers, operating on the same features—hence the features (e.g., index matrix) can be extracted once (and then updated, if desired). The first classifier can be trained to distinguish between barcodes in arbitrary orientations and other content (i.e., content containing no-barcodes). This first classifier can be used in a first step in barcode localization to determine high probability areas for barcode presence (or not) within a digital image. These high probability areas typically are found at or around a barcode's center.

The remaining classifiers (e.g., the remaining 16 classifiers) can be training and used to distinguish between different barcode orientations. In the 17 classifier example, the remaining 16 classifiers currently correspond to angles 11.25, 22.5, . . . , 168.75 degrees. Of course, more or less classifiers can be used, including additional or other angles other implementations. Once a barcode center is located, the remaining orientation classifiers may evaluate the center's neighborhood to decide which ones have the highest values (e.g., highest probability metrics). The highest value classifiers can be used to identify the likely origination of the bounding box or barcode. The terms "bounding box" as used in this document includes an area or region, or an outline or boarder of such an area or region, likely including a barcode.

Training

The feature sets are extracted from multiple images in both classes (first class: barcode, and second class: no-barcode) and they are given to the classifier together with the class labels. The classifier then searches for optimal vector w that minimizes the square (if using so-called L2 criterion) of distance of the wrongly classified samples from the boundary, or simply to minimize the distance itself (if using so-called L1 criterion) from the wrongly classified samples from the boundary. Therefore, the training process trains' the vector w which then can be applied to predict whether an image contains a barcode or not for previously unseen samples.

Before training, the n-sample set of feature vectors x can be normalized to mean($x_i$)=0 and std($x_i$)=1, i∈{1, . . . , n}. After the training, this normalization can be applied for each new testing sample. Alternatively, normalization can be applied to vector w to save runtime by precomputing it. Moreover, the whole model can be converted into integers, e.g., by multiplying by 32768.

Training Set for an Example Implementation

Multiple image samples were obtained from the internet and from assignee Digimarc Corp.'s own internal databases. From the obtained images, 1000 images including barcode areas and 500 images not including barcode areas were selected. Of course, we could increase or decrease the number of selected images in other implementations.

Barcode Orientation

Estimation of the barcode orientation can be structured as a multi-class problem. In one example implementation, orientation uses multiple classifiers, e.g., 16 classifiers, each trained to distinguish between one specific rotation and the rest (e.g., all other images including images with other barcode rotations+images with no barcodes). Each classifier represents one of the 16 angles—0, 11.25, 22.5, 33.75, 45, . . . , 168.75 degrees.

A training set for angle α can be created in the following manner:

Barcodes rotated by angle α—Each of 1000 images including barcodes can be rotated to be in a horizontal position. Then, each barcode is randomly rotated by some offset, e.g., [α−5.625, α+5.625] degrees.

The other class—Mix of barcodes images and no-barcode images randomly rotated by any other angle than [α−5.625, α+5.625].

Barcode Localization

For barcode localization, the selected images were used to create a training set with 5000 images in both classes ($1^{st}$ class: barcode, and $2^{nd}$ class: no-barcode):

Barcode class—312 or 313 rotated barcode images were randomly selected from each of the 16 barcode orientation databases. This yields a total of 5000 images, each image including a barcode.

No-barcode class—Each of 500 no-barcode images was ten (10) times randomly rotated between 0 and 360 degrees. This yields a total of 5000 images, each with no barcode.

From Features to Merged Heat Map—Single Heat Map Extraction for a Given Model

Figure 11:
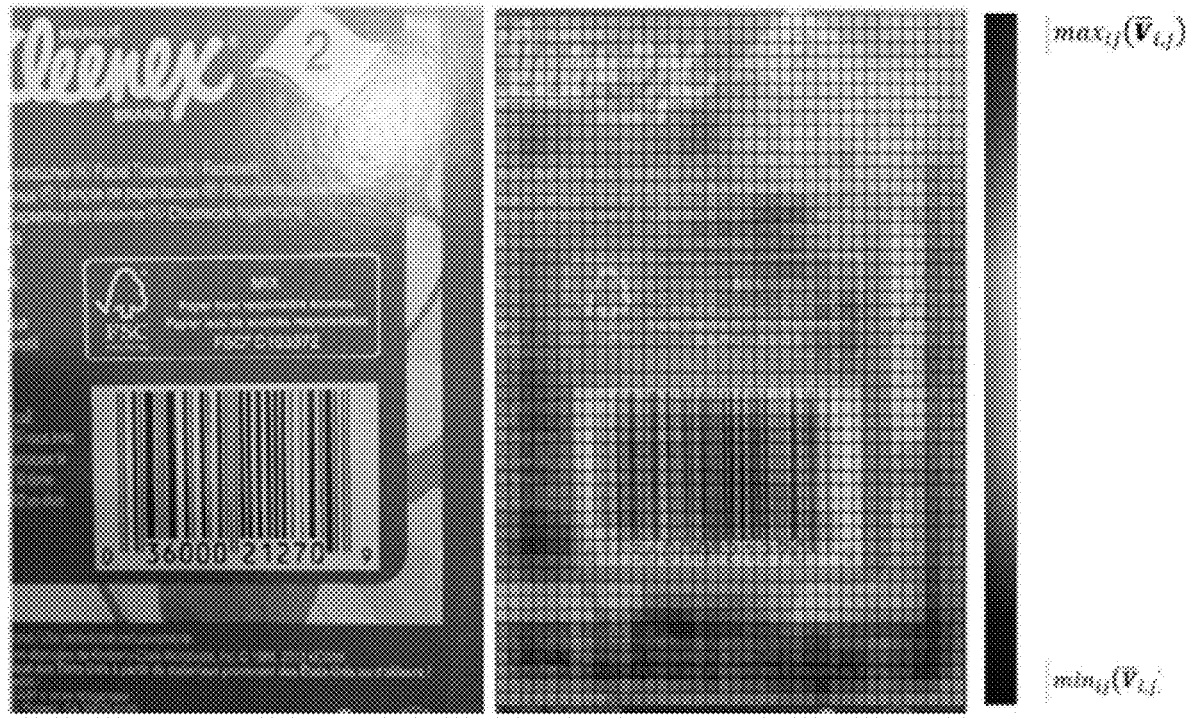
FIG. 11 shows an analyzed image (left) captured with a cell phone camera, and a heat-map representation of such analyzed image using averaged sub-block values V (right).

An image to be analyzed, e.g., FIG. 11 (left) can be divided into multiple non-overlapping square areas $S_{i,j}$ (sub-blocks), where i∈{1, . . . , $M_S$} and j∈{1, . . . , $N_S$} are the coordinates within the square grid. From each area, a feature vector $s_{i,j}=f(S_{i,j})$ can be extracted.

A model m can be used with a trained vector $w^{(m)}$. For each averaged sub-block feature vector $s_{i,j}$, we can compute the dot product $V_{i,j}^{(m)}=w^{(m)} \cdot s_{ij}^T$. In the resulting matrix $V_{i,j}^{(m)} \in \mathbb{R}^{M_S \times N_S}$, the higher the value the more probable is the presence of the barcode (depending on the used model, e.g., barcode present or not) in the location i, j.

For a practical implementation the feature vector need not be computed because the value of V(i,j) for a given classifier can be computed directly from the index matrix.

To improve robustness while preserving the sub-block spatial resolution, we can compute the sub-block average matrix $\overline{V}$ by averaging every value in element's k×k neighborhood. For simplicity, it can be assumed that k is an odd number. Formally, $$\overline{V}_{i,j} = \frac{1}{k^2} \sum_{u=i-\frac{k-1}{2}}^{u=i+\frac{k-1}{2}} \sum_{v=j-\frac{k-1}{2}}^{v=j+\frac{k-1}{2}} V_{u,v}.$$

The visualized matrix $\overline{V}^{(m_l)}$ where the model $m_l$ is the barcode location model (not orientation) is shown in FIG. 11 In a preferred implementation, the size of each sub-block includes a down-sampling, e.g., 8×8 down-sampled values, and the averaging neighborhood can be a reduced set, e.g., 5×5 (k=5).

Obtaining a Merged Heat Map

First, the technique from above can be applied on the barcode location model $m_1$. This will result in a heat map, a graphical example of such is shown in FIG. 11 (right). The coordinate of the maximum value of this location heat map c∈{1, . . . , $M_S$}×{1, . . . , $N_S$} is treated as a barcode center. To determine the barcode rotation, the subset of index matrix around the center with size corresponding to 5×5 sub-blocks is extracted. This area should still mostly contain the barcode and this index subset is classified using the 16 rotation models. The orientation model with highest classification value corresponding to $\text{argmax}_m(\overline{V}_c^{(m)})$ can be considered as a primary orientation (angle α), denoted $m_\alpha$.

Since an actual orientation might lie directly between two angles represented by one of the 16 models or the barcode orientation might change over the image, a secondary orientation angle can be added. The secondary orientation (angle $\beta$) is given as the larger of two neighbors of the primary orientation and it can be denoted $m_\beta$.

The weight of heat maps created from both orientation models, $r_\alpha$, can be determined by using a ratio, $$r_\alpha = \overline{V}_c^{(m\alpha)} / (\overline{V}_c^{(m\alpha)} + \overline{V}_c^{(m\beta)}).$$

The merged heat map of a barcode location heat-map and barcode orientation heat map. A constant $t \in [0,1]$ determines the tradeoff between those two. Consequently, the values of the merged heat map H that is used to find a bounding box can be determined as:

$$H_{i,j} = (1-t)\overline{V}_{i,j}^{(ml)} + t(r_\alpha \overline{V}_{i,j}^{(m\alpha)} + (1-r_\alpha)\overline{V}_{i,j}^{(m\oplus)})$$

where $i \in \{1, \ldots, M_S\}$, $j \in \{1, \ldots, N_S\}$. Currently, the weight of barcode orientation heat map t is set to 0.8. Of course, this weighting can be changed to achieve desired emphasis. Also, at this point, the estimated barcode orientation $\theta$ can be given as $$\theta = r_\alpha \alpha + (1-r_\alpha)\beta$$

From Merged Heat Map to Bounding Box

This section describes a process for obtaining coordinates of four bounding box corners from the merged heat map H and the center coordinate c described above.

Step 1—Merged Heat Map Rotation Alignment

The matrix H is rotated by $-\theta$ degrees to create aligned matrix H'. The values are bilinearly interpolated. Moreover, also find rotated center coordinate c', formally $c' = \text{rot}_{-\theta}(c)$.

Step 2—Bounding Box Initialization

Bounding box can be initialized as 1×1 neighborhood of the center $c' = (c'_{row}, c'_{col})$. In other words, top=floor($c'_{row}$),botom=ceil($c'_{row}$),left=floor($c'_{col}$), right=ceil($c'_{col}$)

Step 3—Bounding Box Expansion Algorithm

Evaluate, e.g., 6 possible bounding box expansions (Matlab matrix coordinate notation):

Top by 1: $p_{t1}$=median(H'(top−1,left:right))
Bottom by 1: $p_{b1}$=median(H'(bottom+1, left:right))
Left by 1: $p_{l1}$=median(H'(top:bottom, left−1))
Left by 2: $p_{l2}$=median(H'(top:bottom, left−2))
Right by 1: $p_{r1}$=median(H'(top:bottom, right+1))
Right by 2: $p_{r2}$=median(H'(top:bottom, right+2))

Find the maximum from all $p_{}$ and if this maximum is higher than some threshold (currently 0), move the bounding box edge in the corresponding direction and by the corresponding shift (1 or 2). Then repeat the step 3. If the maximum of $p_{}$ is not higher than the threshold, then end the bounding box expansion. As an implementation note, the expansion to the left and right by 2 can be considered in order to jump over possible wide white spaces between barcode stripes.

Step 4—Invert the Rotation of the Bounding Box Coordinates

The resulting bounding box corner coordinates can be expressed as

Top-left: $\text{rot}_\theta$(top,left)
Bottom-left: $\text{rot}_\theta$(bottom,left)
Top-right: $\text{rot}_\theta$(top,right)
Bottom-right: $\text{rot}_\theta$(bottom,right)

Once a barcode is localized, the image area corresponding to such can be analyzed to decode numeric numbers to barcode symbols (e.g., bars and spaces).

For some of the claims we may expressly use "mean plus function" language. The functions and algorithms are apparent from the above detailed description. We expressly contemplate that the corresponding structure used to implement such function and algorithms may include, e.g., one or more configured processors, one or more application specific integrated circuits (ASIC), one or more configured graphic processors, a programmed smartphone, a retail point of sale scanner station, and/or a touchscreen and other displays, and/or their equivalents, etc. Of course, other supporting structure/functions are found throughout this document, including from the incorporated by reference documents.

Operational Environments

Having described and illustrated principles of the technology with reference to certain embodiments, it should be recognized that the technology is not so-limited.

For example, while the foregoing description has focused on barcode localization, the artisan will recognize that the detailed arrangements can also be used advantageously in extracting information from imagery by other techniques, such as by optical character recognition (OCR), watermark decoding, image fingerprint recognition (e.g., by SIFT, bag-of-features techniques, etc.), and recognition by neural networks (e.g., convolutional neural networks, as detailed in Applicant's U.S. Pat. No. 10,664,722, which is hereby incorporated herein by reference in its entirety). For example, our content detector technology (e.g., as discussed with reference to FIGS. 4A and 4B) can be used prior to image icon detection or fingerprint extraction.

Although some of the above examples employed a single barcode detector, e.g., to successively examine multiple bounding boxes, it should be recognized that multiple barcode detectors can run simultaneously, e.g., on different cores of a multi-core processor. Thus, for example, a first bounding box may be submitted for decoding on a Core 2, while a second bounding box being decoded by a Core 1.

While the emphasis of the foregoing description has been on implementations in mobile smartphone image capture, it will be recognized that the principles of this technology finds utility in various different contexts, including industrial applications (e.g., warehouse management and e-commerce fulfillment) and consumer checkout (e.g., in connection with point of sale camera).

Computing devices suitable to perform the processes detailed herein are familiar to the artisan. In general terms, each may include one or more processors, one or more memories (e.g. RAM), storage (e.g., a disk or flash memory), a user interface (which may include, e.g., a keypad, a TFT LCD or OLED display screen, touch or other gesture sensors, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The arrangements detailed above can be implemented using a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular type of hardware structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed arrangements, e.g., the systems, methods and algorithms discussed relative to FIGS. 4A and 4B, on a microprocessor, involves first defining a sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

As noted, many microprocessors are now amalgamations of several other microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to compute a Shannon entropy metric, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed technology, e.g., the systems, methods and algorithms discussed relative to FIGS. 4A and 4B, again begins by defining a sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed systems, methods and algorithms discussed relative to FIGS. 4A and 4B, is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories.

Yet another hybrid approach employs application-specific instruction set processors (ASIPS). ASIPS can be thought of as microprocessors. However, instead of having multi-purpose native instruction sets, the instruction set is tailored—in the design stage, prior to fabrication—to a particular intended use. Thus, an ASIP may be designed to include native instructions that serve operations prevalent in a particular application (e.g., pixel greyscale mean value). However, such native instruction set would typically lack certain of the instructions available in more general purpose microprocessors.

Reconfigurable hardware and ASIP arrangements are further detailed in patent published patent application 20170004597, the disclosure of which is incorporated herein by reference in its entirety.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., in conjunction with associated data.

Software and hardware configuration data/instructions are commonly stored as instructions in one or more data structures conveyed by non-transitory media, such as magnetic or optical discs, memory cards, RAM, ROM, etc., which may be accessed across a network.

Different of the functionality can be implemented on different devices. Thus, it should be understood that description of an operation as being performed by a particular device (e.g., a smartphone in warehouse or inventory room) is not limiting but exemplary; performance of the operation by another device (e.g., a cloud computer), or shared between devices, is also expressly contemplated. In like fashion, description of data being stored on a particular device is also exemplary; data can be stored anywhere: local device, remote device, in the cloud, distributed, etc.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re order acts (possibly omitting some and adding others), and other contemplated combinations may omit some elements and add others, etc.

Although disclosed as complete systems, sub-combinations of the detailed arrangements are also separately contemplated (e.g., omitting various features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible, non-transitory computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein in its entirety including any appendices and all drawings. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, Applicant claims as the invention all such modifications as may come within the scope and spirit of the following claims and equivalents thereof.

What is claimed is:

1. An image processing method comprising:
  obtaining data representing optically captured imagery, the optically captured imagery depicting a plurality of barcodes, with each of the plurality of barcodes being associated with a first color, said obtaining data yielding obtained data;
  using one or more multi-core processors:
    locating regions within the obtained data that include the first color;
    reducing image content from the obtained data other than image data within located regions;
    creating a bounding box around each of the regions; and
    searching only within bounding boxes to decode a 1D or 2D barcode.

2. The image processing method of claim 1 in which the obtained data is represented in a YUV color space.

3. The image processing method of claim 1 in which the reducing image content utilizes a heatmap emphasizing the first color.

4. The image processing method of claim 1 in which the first color comprises yellow.

5. An image processing method comprising:
  obtaining data representing optically captured imagery, the optically captured imagery depicting a 1D or 2D barcode, the 1D or 2D barcode being associated with a first color and a second color, said obtaining data yielding obtained data;
  using one or more multi-core processors:
    locating a first region within the obtained data that includes the first color;
    locating a second region within the obtained data that includes the second color;

dilating each of the first region and the second region;
determining whether the first region and the second region overlap;
creating a bounding box around the first region when there is the overlap; and
searching obtained data only within the bounding box to decode the 1D or 2D barcode.

6. The image processing method of claim 5 in which the obtained data is represented in a YUV color space.

7. The image processing method of claim 5, and prior to locating a first region, downsampling the obtained data.

8. The image processing method of claim 7 in which the searching obtained data occurs on the obtained data and not the downsampled obtained data.

9. The image processing method of claim 5 in which the first color comprises yellow and the second color comprises orange.

10. A method of locating a barcode within imagery, comprising:
converting the imagery to greyscale imagery;
evaluating a plurality of blocks within the greyscale imagery, each of the plurality of blocks comprising n×m pixels, where both n and m are positive integers;
for each block of the plurality of blocks, determining a value representing pixel diversity within the each block;
masking the greyscale imagery based on values of the plurality of blocks, in which blocks with a value below a predetermined value of pixel diversity are masked out or excluded, said masking the greyscale imagery yielding masked, grey scale imagery;
searching the masked, greyscale imagery to determine whether it includes the barcode represented therein.

11. The method of claim 10 in which the value representing pixel diversity within the each block comprises pixel variance within the each block.

12. The method of claim 10 in which the value representing pixel diversity within the each block comprises pixel dynamic range within the each block.

13. The method of claim 10 in which said searching comprises:
generating an edge orientation sensitive feature set from data representing the greyscale imagery;
using a first trained classifier to determine whether the feature set includes data representing the barcode; and
using N additional trained classifiers to determine an orientation angle associated with the barcode, wherein N comprises an integer greater than 3;
generating a scanline through the data representing the barcode;
decoding the scanline to obtain a plural-bit identifier carried by the barcode.

14. An apparatus comprising:
an input to receive obtained data representing optically captured imagery, the optically captured imagery depicting a plurality of barcodes, with each of the plurality of barcodes being associated with a first color;
means for locating regions within the obtained data that include the first color;
means for reducing image content from the obtained data other than image data within located regions;
means for creating a bounding box around each of the regions; and
means for searching only within bounding boxes to decode a 1D or 2D barcode.

15. The apparatus of claim 14 in which the obtained data is represented in a YUV color space.

16. The apparatus of claim 14 in which said means for reducing image content utilizes a heatmap emphasizing the first color.

17. The apparatus of claim 14 in which the first color comprises yellow.

18. An apparatus comprising:
an input to receive obtained data representing optically captured imagery, the optically captured imagery depicting a 1D or 2D barcode, the 1D or 2D barcode being associated with a first color and a second color;
means for locating a first region within the obtained data that includes the first color;
means for locating a second region within the obtained data that includes the second color;
means for dilating each of the first region and the second region;
means for determining whether the first region and the second region overlap;
means for creating a bounding box around the first region when there is the overlap; and
means for searching the obtained data only within the bounding box to decode the 1D or 2D barcode.

19. The apparatus of claim 18 in which the obtained data is represented in a YUV color space.

20. The apparatus of claim 18 further comprising means for downsampling the obtained data.

21. The apparatus of claim 20 in which said means for searching image data operates on the obtained data and not on downsampled obtained data.

22. The apparatus of claim 18 in which the first color comprises yellow and the second color comprises orange.

23. An apparatus comprising:
means for converting imagery to greyscale imagery;
means for evaluating a plurality of blocks within the greyscale imagery, each of the plurality of blocks comprising n×m pixels, where both n and m are positive integers;
means for determining a value representing pixel diversity within a block for each of the plurality of blocks;
means for masking the greyscale imagery based on values of the plurality of blocks, in which blocks with a value below a predetermined value of pixel diversity are masked out or excluded, said means for masking yielding masked, greyscale imagery;
means for searching the masked, greyscale imagery to determine whether it includes a barcode represented therein.

24. The apparatus of claim 23 in which the value representing pixel diversity within the block comprises pixel variance within the block.

25. The apparatus of claim 23 in which the value representing pixel diversity within the block comprises pixel dynamic range within the block.

26. The apparatus of claim 23 in which said means for searching is configured to operate as follows:
generating an edge orientation sensitive feature set from data representing the greyscale imagery;
using a first trained classifier to determine whether the feature set includes data representing a barcode; and
using N additional trained classifiers to determine an orientation angle associated with the barcode, wherein N comprises an integer greater than 3;

generating a scanline through the data representing the barcode;

decoding the scanline to obtain a plural-bit identifier carried by the barcode.

* * * * *